United States Patent
Jones et al.

(10) Patent No.: US 10,565,408 B2
(45) Date of Patent: *Feb. 18, 2020

(54) SHOPPING CART WITH AN RFID INTERFACE AND ASSOCIATED SYSTEMS AND METHODS

(71) Applicant: Walmart Apollo, LLC, Bentonville, AR (US)

(72) Inventors: Matthew Allen Jones, Bentonville, AR (US); Nicholaus Adam Jones, Fayetteville, AR (US); Aaron Vasgaard, Fayetteville, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/878,799

(22) Filed: Jan. 24, 2018

(65) Prior Publication Data
US 2018/0211074 A1    Jul. 26, 2018

Related U.S. Application Data

(60) Provisional application No. 62/450,737, filed on Jan. 26, 2017.

(51) Int. Cl.
*G06K 7/10* (2006.01)
*G06K 19/07* (2006.01)
*G06F 16/903* (2019.01)

(52) U.S. Cl.
CPC ... *G06K 7/10366* (2013.01); *G06F 16/90335* (2019.01); *G06K 19/0723* (2013.01)

(58) Field of Classification Search
CPC .......... G06K 7/10366; G06K 17/0029; G06K 2017/0067; G06K 19/0723; G06F 16/381; G06F 16/90335; G06F 17/30979
(Continued)

(56) References Cited

U.S. PATENT DOCUMENTS 7,660,747 B2   2/2010 Brice et al.
8,589,259 B2   11/2013 Kunieda et al.
(Continued)

FOREIGN PATENT DOCUMENTS

AU   2013101455 A4   12/2013
CN   102963407 A    3/2013
(Continued)

OTHER PUBLICATIONS

International Search Report and Written Opinion for Application No. PCT/US20181014967, dated Mar. 16, 2018. 10 pages.
(Continued)

*Primary Examiner* — Seung H Lee
(74) *Attorney, Agent, or Firm* — McCarter & English, LLP; David R. Burns

(57) ABSTRACT

Described in detail herein are systems and methods for interacting with an interactive display using a shopping cart. A RFID reader can read RFID tags integrated with a handle portion of a shopping cart. A unique identifier can be encoded in each of the RFID tags. A user of the shopping cart can the RFID reader from reading one or more of the RFID tags in response to a hand of a user obscuring the one or more RFID tags. The RFID reader can detect which of RFID tag(s) are covered. The RFID reader can transmit the identifier(s) of the covered RFID tag(s) to a computing system. The computing system can include an interactive display. The computing system can retrieve a specified action to be performed on the interactive display. The computing system can control, to perform a specified action on the interactive display.

20 Claims, 7 Drawing Sheets

(58) Field of Classification Search
USPC .......................................................... 235/383
See application file for complete search history.

(56) References Cited

U.S. PATENT DOCUMENTS

| | | | |
|---|---|---|---|
| 8,639,543 | B2 | 1/2014 | Boss et al. |
| 8,950,671 | B2 | 2/2015 | Chan et al. |
| 9,378,484 | B1 | 6/2016 | Russell et al. |
| 9,449,295 | B2* | 9/2016 | Russell ............... G06Q 10/087 |
| 9,811,955 | B2* | 11/2017 | Russell ............... G07C 9/00031 |
| 9,830,484 | B1* | 11/2017 | Zerlina ............... G06K 7/10366 |
| 9,996,167 | B2* | 6/2018 | Russell ............... G06Q 10/00 |
| 10,093,333 | B2* | 10/2018 | Jones ................... B62B 3/1424 |
| 2001/0028301 | A1* | 10/2001 | Geiger ................. B62B 3/1408 340/5.91 |
| 2002/0170961 | A1 | 11/2002 | Dickson et al. |
| 2005/0062247 | A1 | 3/2005 | Sheem |
| 2005/0187819 | A1 | 8/2005 | Johnson |
| 2006/0010027 | A1 | 1/2006 | Redman |
| 2006/0114104 | A1* | 6/2006 | Scaramozzino ......... G01S 5/02 340/10.2 |
| 2006/0289637 | A1 | 12/2006 | Brice et al. |
| 2007/0152829 | A1* | 7/2007 | Lindsay ............. G06K 19/0717 340/572.3 |
| 2007/0228678 | A1 | 10/2007 | Solomon et al. |
| 2008/0231432 | A1 | 9/2008 | Stawar et al. |
| 2008/0243626 | A1 | 10/2008 | Stawar et al. |
| 2010/0308964 | A1* | 12/2010 | Ackley ................ H04B 5/0031 340/10.1 |
| 2011/0012713 | A1* | 1/2011 | Wilkinson ......... G06K 7/10178 340/10.3 |
| 2012/0296751 | A1 | 11/2012 | Napper |
| 2014/0001258 | A1 | 1/2014 | Chan et al. |
| 2014/0176307 | A1* | 6/2014 | Forster ............. G06K 19/07345 340/10.4 |
| 2015/0206121 | A1 | 7/2015 | Joseph et al. |
| 2015/0356329 | A1 | 12/2015 | Erez et al. |
| 2017/0185950 | A1* | 6/2017 | Roet ................... G06Q 10/087 |
| 2017/0200033 | A1* | 7/2017 | Li ........................ G06F 16/786 |
| 2018/0174215 | A1* | 6/2018 | Medina .............. G06Q 30/0613 |

FOREIGN PATENT DOCUMENTS

| | | |
|---|---|---|
| DE | 202005005851 U1 | 6/2005 |
| EP | 623904 A1 | 11/1994 |
| EP | 2072371 A2 | 6/2009 |
| WO | 200193150 A1 | 12/2001 |
| WO | 2006053381 A1 | 5/2006 |

OTHER PUBLICATIONS

The future of retail isn't what you think, Digital Services, http://www.strategyand.pwc.com/digital/, 2010-2016.

Zimmerman, Ann, Chout the Future of SHoppipng—Shaving Time Off the Weekly Grocery Run to Keep Consumers in Stores and Spending, The Wall Street Journal, May 18, 2011.

* cited by examiner

SHOPPING CART WITH AN RFID INTERFACE AND ASSOCIATED SYSTEMS AND METHODS

CROSS-REFERENCE TO RELATED PATENT APPLICATIONS

This application claims priority to U.S. Provisional Application No. 62/450,737 filed on Jan. 26, 2017, the content of which is hereby incorporated by reference in its entirety.

BACKGROUND

Providing biometric information to authenticate a user can provide for a secure system.

BRIEF DESCRIPTION OF DRAWINGS

Illustrative embodiments are shown by way of example in the accompanying drawings and should not be considered as a limitation of the present disclosure.

DETAILED DESCRIPTION

Described in detail herein are systems and methods for interacting with an interactive display using a shopping cart. The shopping cart can include a frame having a handle portion, a basket supported by the frame, and casters configured to support the frame. RFID tags integrated with the handle portion of a shopping cart, and are capable of being read by the RFID reader(s) in response to the RFID tags being within range of the RFID reader(s). Transmission from the RFID tags can be selectively controlled such that the RFID tags are capable of being read or incapable of being read by one or RFID readers when the RFID tags are within range of the RFID reader(s). A unique identifier can be encoded in each of the RFID tags. In an example embodiment, a user of the shopping cart can prevent the RFID reader(s) from reading one or more of the RFID tags by obscuring or covering the one or more RFID tags with a body part of the user (e.g., one or more fingers, a hand, etc.). The RFID reader(s) can transmit the identifier(s) of the unobscured or uncovered RFID tag(s) to a computing system, and the computing system can determine which of RFID tag(s) are covered (e.g., based on reading the other RFID tags on the cart and not reading the covered RFID tag(s)). The computing system can include an interactive display. The computing system can retrieve a specified action to be performed on the interactive display, and can control the interactive display to perform a specified action on the interactive display in response to determining which of the RFID tag(s) were not read. The computing system is configured to control the interactive display to perform different actions on the interactive display in response to determining that different ones of the plurality of RFID tags have be selectively covered or obscured.

A plurality of physical objects are disposable in the basket of the cart and the physical objects can include item RFID tags. The item RFID tags are encoded with identifiers associated with each of the physical objects. The RFID reader(s) is configured read the RFID tags included on the physical objects and decode the identifiers. The computing system is further configured to receive the identifiers associated with each of the physical objects from the RFID reader(s), query the database to retrieve information associated with each of the physical objects and control the interactive display to display the information associated with each of the physical objects.

Figure 1A:
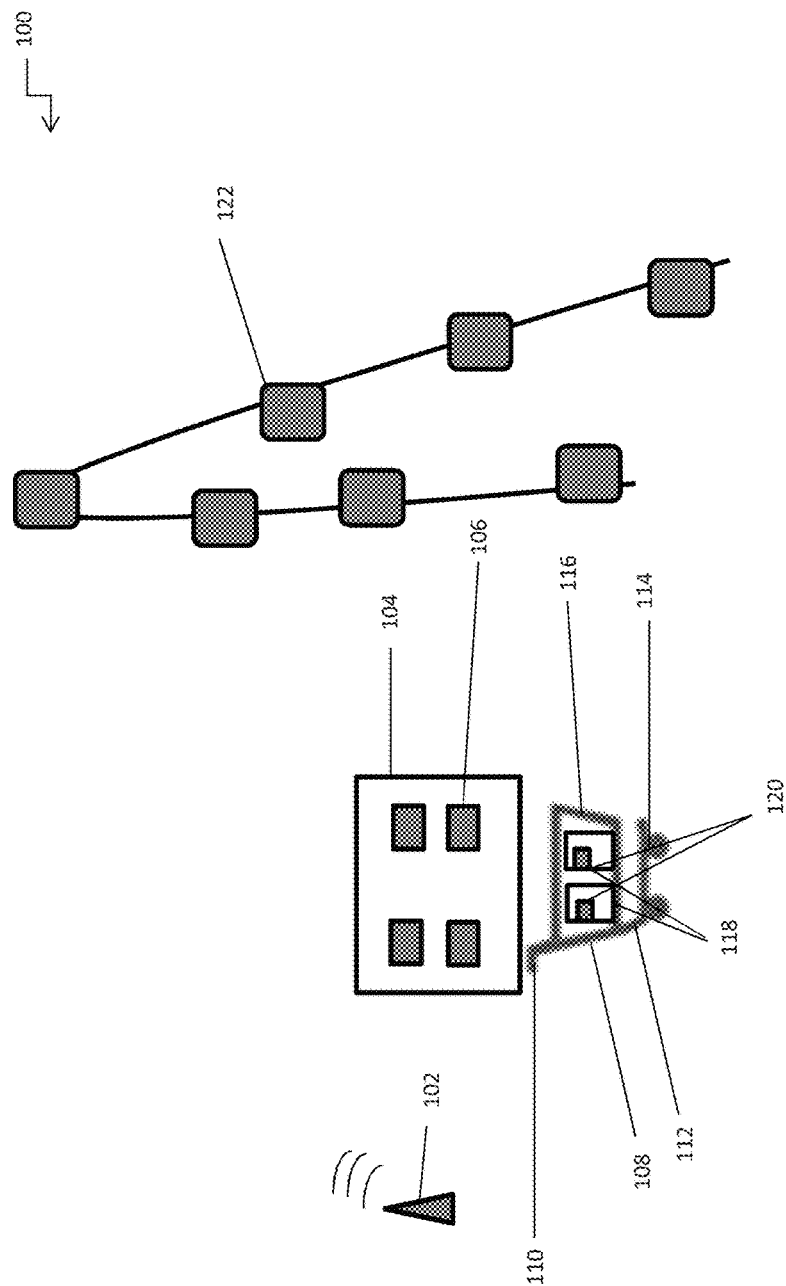
FIG. 1A is a diagram of a shopping cart and an interactive display in a facility according to the present disclosure.
Figure 1B:
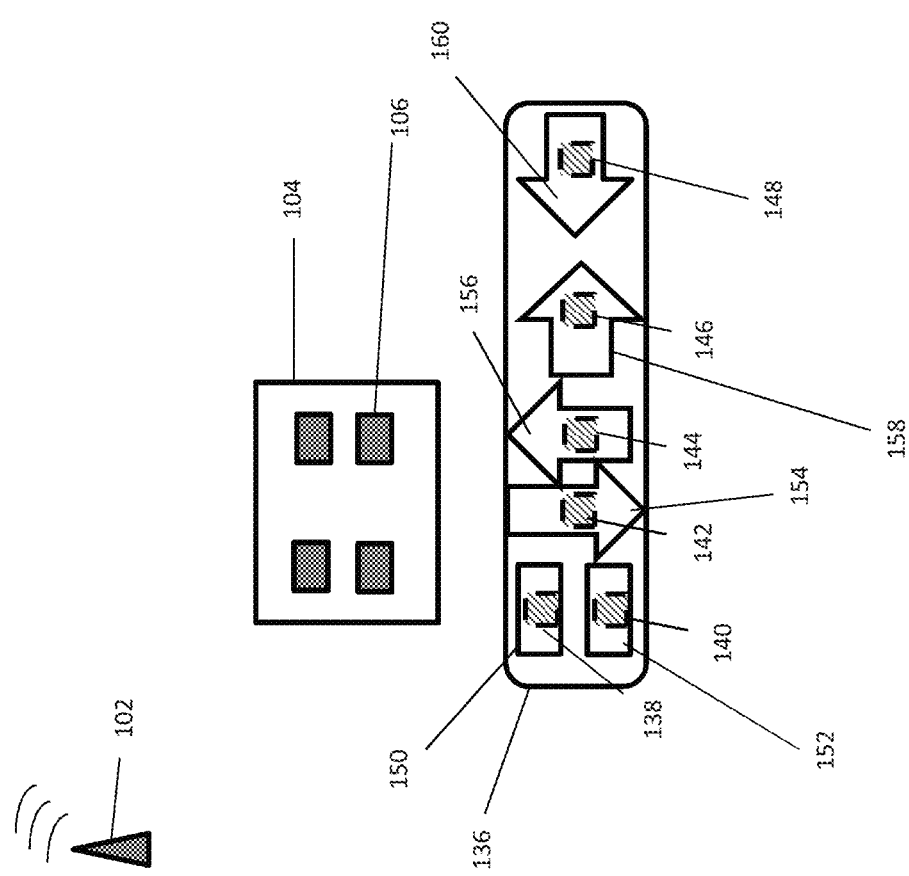
FIG. 1B is an exploded view of the handle portion of the shopping cart according to embodiments of the present disclosure.

FIG. 1A is a diagram of a shopping cart and an interactive display in a facility according to the present disclosure. A shopping cart 108 can be operated in a facility 100 by a user. The shopping cart 108 can include a frame 112 having a handle portion 110, a basket 116 supported by the frame 112 and casters 114 configured to support the frame 112. The basket 116 can be configured to support and store physical objects 118. RFID tags 120 can also be disposed on the physical objects 118. The RFID tags 120 can be encoded with unique identifiers associated with the physical objects. One or more RFID tags can be integrated with the handle portion 110 of the shopping cart 108 as shown in FIG. 1B. In some embodiments, an individual RFID reader 102 can be configured to detect and extract unique identifiers from the RFID tags 120 in disposed on the physical objects and the RFID tags integrated in the handle portion 110 of the shopping cart 108. Alternatively, or in addition to, an archway or tunnel of RFID readers 122 (or other configuration of RFID readers) can be disposed in the facility. The shopping cart 108 can be configured to navigate through the archway of RFID readers 122 and the archway of RFID readers 122 can detect the RFID tags 120 disposed on the physical objects 118. The shopping cart 108 can navigate to the computing system 104 with an interactive display 106 and interact with the interactive display 106 using the RFID tags integrated with the handle portion 110 of the shopping cart 108.

FIG. 1B is an exploded view of the handle portion of the shopping cart according to embodiments of the present disclosure. The handle portion 136 of the shopping cart can include one or more RFID tags 138-148 integrated in therein. The RFID tags 138-148 can be passive RFID tags that do not require an internal power source, and are powered with electromagnetic energy transmitted by the RFID reader. A unique identifier can be encoded in each of the RFID tags 138-148. The RFID tags 138-148 can be readable by the RFID reader 102 when in range of the RFID reader 102. The RFID reader 102 can receive the unique identifiers of the RFID tags 138-148. A user can cover one or more of the RFID tags 138-148 using the user's digits or hands to make the one or more of the RFID tags 138-148 unreadable (e.g., to block electromagnetic radiation from the RFID reader and/or to prevent transmission of radiofrequency signal from the covered RFID tag(s). The uncovered RFID tags can receive the electromagnetic radiation of a radiofrequency transmission from the RFID reader(s) and can transmit a radiofrequency signal that includes their respective unique identifiers in response to the electromagnetic radiation from the radiofrequency transmission emitted by the RFID reader(s). The RFID reader 102 forward the received unique identifiers to the computing system 104, which can determine which of the unique identifiers of the one or more RFID tags is received and which are not (i.e. which of the RFID tags were read and which were not). The computing system 104 can control the interactive display 106 of the computing system 104 based on the one or more RFID tags that were not read by the RFID reader(s).

As an example, the computing system 104 can determine the user is attempting to interact with the interactive display 106 in response to the RFID reader 102 not being able to detect and/or read the RFID tag 142, which is covered by the users hand, and being able to detect and/or read RFID tags 138, 140, 144, 146 and 148. The computing system 104 can execute an action correlated to the covered, unread RFID tag 142 on the interactive display 106. The action could be one or more of, scroll, input information and/or make selections on the interactive display. In example embodiments, the RFID tags 138-148 can be passive RFID tags, where the RFID tags 138-148 can use power harvested from RFID reader 102 emissions and/or can be active RFID tags 138-148, where the RFID tags and/or the shopping cart can also optionally include a portable power supply such as a battery to power independently power the RFID tags 138-148. Also if desired, the shopping cart can include a recharging circuit (not shown) that serves to recharge such a battery (using, for example, externally-provided electric power and/or harvested RFID reader emissions).

As shown in FIG. 1B, indicia 150-160 representing an action to execute on the interactive display 106 can be disposed on top of each of the RFID tags 138-148. Accordingly, the indicia 150-160 can direct the user to cover up the RFID tag 138-148 disposed below the indicia 150-160 when the user is attempting to execute the action represented by the indicia 150-160 on the interactive display 106. For example, indicia 150 and/or 152 can represent return or delete, indicia 154 can represent the action of scrolling down, indicia 156 can represent scrolling up, indicia 158 can represent scrolling left, and indicia 160 can represent scrolling right. The RFID tag 138 can be disposed below indicia 150, the RFID tag 140 can be disposed below indicia 152, the RFID tag 142 can be disposed below indicia 154, the RFID tag 144 can be disposed below indicia 156, the RFID tag 146 can be disposed below indicia 158, and the RFID tag 148 can be disposed below the indicia 160. The user can cover up the respective RFID tags 138-148 to execute the actions as described above.

Figure 1C:
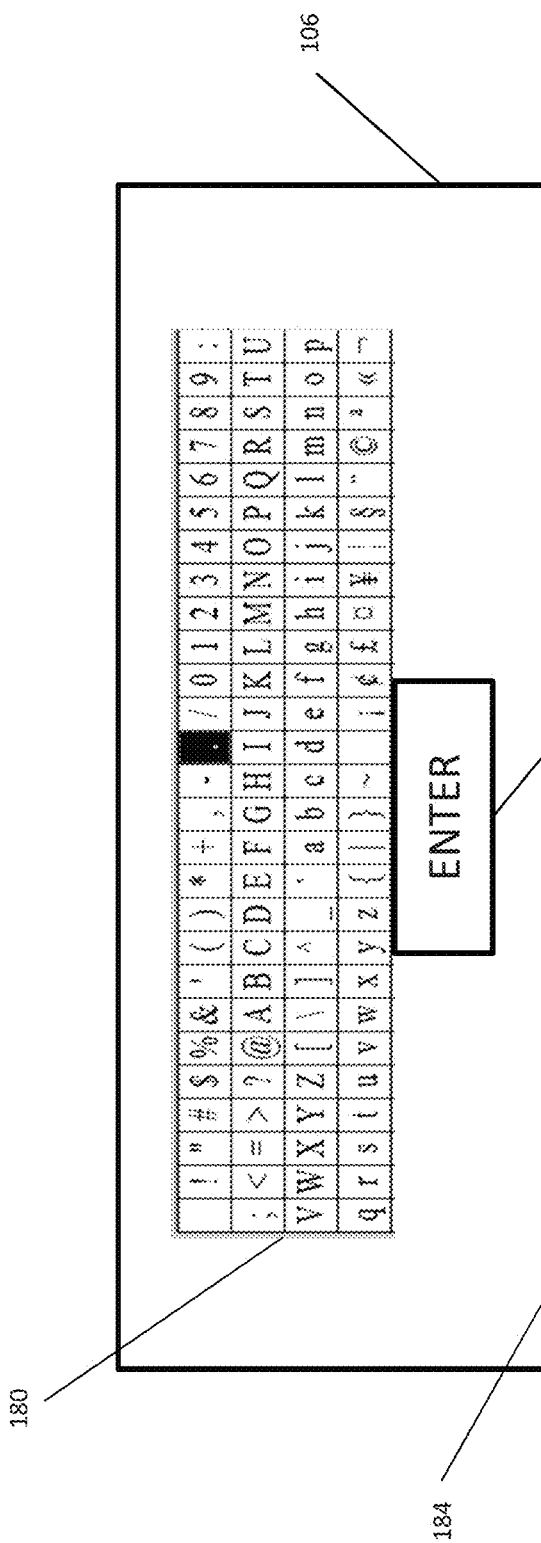
FIG. 1C illustrates the interactive display in accordance with an exemplary embodiment.

FIG. 1C illustrates the interactive display in accordance with an exemplary embodiment. In an exemplary embodiment, the RFID tags (i.e. RFID tags 138-148 as shown in FIG. 1B) can be used to enter alphanumeric text. For example, the interactive display 106 can render a selection of alphanumeric characters 180. A user can scroll on the screen using the RFID tags to select alphanumeric characters. The input 184 can also be rendered on the screen. The input 184 can be usernames, passwords, search requests or any other input for the computing system (i.e. (e.g. computing system 104 as shown in FIGS. 1A-B). The user can submit the input by selecting the "ENTER" key 182.

Figure 2:
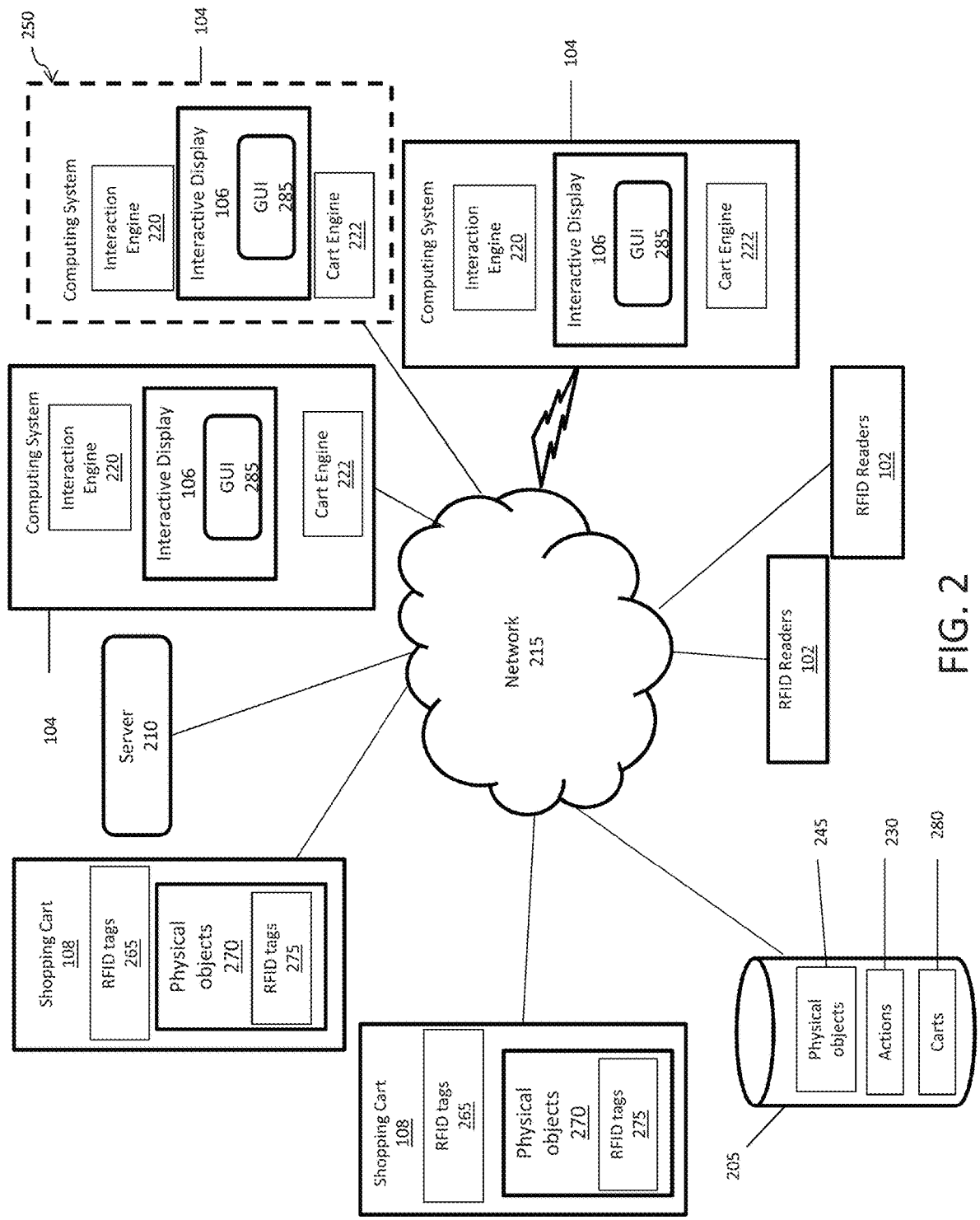
FIG. 2 illustrates an exemplary shopping cart authentication system in accordance with exemplary embodiments of the present disclosure.

FIG. 2 illustrates an exemplary shopping cart authentication system 250 in accordance with exemplary embodiments of the present disclosure. The shopping cart authentication system 250 can include one or more databases 205, one or more servers 210, one or more computing systems 104, one or more shopping carts 108 and RFID readers 102. The shopping carts 260 can include a first set of RFID tags 265 integrated in the handle portion of the shopping cart 108. The RFID tags 265 can be passive tags. Physical objects 270 can be in disposed in the shopping cart 108 and a second set of one or more RFID tags 275 can be disposed on the physical objects. In exemplary embodiments, the computing system 104 is in communication with the databases 205, the server(s) 210, and multiple instances of the RFID readers 102, via a communications network 215. The computing system 104 can implement at least one instance of the interaction engine 220 and/or the cart engine 222. The computing system 104 can also include an interactive display 106. In some embodiments, the RFID readers 102 can form an archway of RFID readers disposed in the facility.

In an example embodiment, one or more portions of the communications network 215 can be an ad hoc network, an intranet, an extranet, a virtual private network (VPN), a local area network (LAN), a wireless LAN (WLAN), a wide area network (WAN), a wireless wide area network (WWAN), a metropolitan area network (MAN), a portion of the Internet, a portion of the Public Switched Telephone Network (PSTN), a cellular telephone network, a wireless network, a WiFi network, a WiMax network, any other type of network, or a combination of two or more such networks.

The server 210 includes one or more computers or processors configured to communicate with the computing system 104 and the databases 205, via the network 215. The server 210 hosts one or more applications configured to interact with one or more components computing system 104 and/or facilitates access to the content of the databases 205. In some embodiments, the server 210 can host the interaction engine 220 or portions thereof. The databases 205 may store information/data, as described herein. For example, the databases 205 can include an actions database 230, physical objects database 245 and the cart database 280. The actions database 230 can store identifiers associated with RFID tags 265 and the correlated actions associated unique identifiers. The physical objects database 245 can store information associated with physical objects disposed in the facility. The cart database 280 can store information associated with shopping carts 108. The databases 205 and server 210 can be located at one or more geographically distributed locations from each other or from the computing system 104. Alternatively, the databases 205 can be included within server 210.

In exemplary embodiments, a user can operate a shopping cart 108 within a facility. The shopping cart 108 can include one or more RFID tags 265. The RFID tags 265 can be integrated with the handle portion of the shopping cart 108. The RFID tags 265 can be encoded with a unique identifier. Physical objects 270 can be disposed in the shopping cart 108 and RFID tags 275 can be disposed on the physical objects 270. Each of the RFID tags 275 can be encoded with a unique identifier associated with the physical object. RFID readers 102 can be disposed throughout the facility. The RFID readers 102 can be configured to detect the RFID tags 265 and 275 when the RFID tags 265, 275 are within a predetermined distance of the RFID readers 102. In some embodiments, an archway of RFID readers 102 can be disposed in the facility configured to detect the RFID tags 265 and/or 275.

A user can navigate the shopping cart 108 to the computing system 104. The computing system 104 can include an interactive display 106. The user can pass through an archway of RFID readers 102 disposed prior to the computing system 104. The RFID readers 102 can detect the RFID tags 275 disposed on the physical objects within the basket of the cart. The RFID readers 102 can extract the unique identifiers from the RFID tags 275 disposed on the physical objects 270 disposed in or about the basket of the shopping cart 108 and transmit the unique identifiers to the computing system 104. The computing system 104 can execute the interaction engine 220 in response to receiving the unique identifiers. The interaction engine 220 can query the physical objects database 245 using the unique identifiers, to retrieve information associated with each physical object 270 disposed in or about the basket of the shopping cart 108. The interaction engine 220 can display the information associated with retrieved for each of the physical objects 270 disposed in or about the basket of the shopping cart 108 on the interactive display 106.

A user can interact and communicate with the interactive display 106 using the RFID tags 265 integrated on the handle portion of the shopping cart 108. A RFID reader 102 can be disposed within a predetermined distance of the computing system 104. The user can execute an action on the interactive display 106 of the computing system 104. The action can be, scrolling on the interactive display, inputting information on the interactive display, and/or making selections on the interactive display. Each RFID tag 265 on the shopping cart can be correlated with at least one action. For example, the RFID tags 265 can be covered and/or uncovered to navigate through one or more graphical user interfaces 285 displayed by the interactive display and/or to enter data into one or more data entry areas in the one or more graphical user interfaces 285. Each RFID tag can also be associated with an identifier. Each RFID tag 265 is constantly detectable to a RFID reader 102 when within range of the RFID reader and when the RFID tag 265 is uncovered. The user can cover a RFID tag 265 using their digits. In response to the RFID tag 265 being covered, the computing system can determine that the covered RFID tag is no longer readable in response to the unique identifier associated with the covered RFID tag not being provided to the computing system from the RFID reader.

The computing system 104 can execute the interaction engine 220 in response to receiving the identifiers. The interaction engine 220 can query the actions database 230 using the identifier to retrieve the action correlated to the covered RFID tag 265. Alternatively, the interaction engine 220 can query the actions database 230 using the combination of identifiers detected by the RFID reader 102 and determined to be uncovered or unobscured by the interaction engine 220, to retrieve a correlated action. The interaction engine 220 can execute the retrieved action on the interactive display 106 of the computing system 104. In some embodiments, the user can cover and/or uncover more than one RFID tags 265. For example, the user can intend to scroll left and make a selection. The user can cover a first RFID tag associated with scrolling left and a second RFID tag associated with making a selection. The RFID reader 102 and/or computing system can determine the time at which each RFID tag becomes readable. The RFID reader can transmit the first and second identifier associated to the first and second RFID tags, to the computing system 104 in the order each RFID tag became unreadable or can cease sending the computing system the first and second identifier and the computing system can determine that the first and second identifiers have been covered. The computing system 104 can execute the interaction engine 220 in response to receiving the covered RFID tags. The interaction engine 220 can retrieve a first and second action correlated to the first and second RFID based on the first and second unique identifiers, from the actions database 230. The interaction engine 220 can execute the first and second action (i.e. scroll to the left and make a selection) on the interactive display 106 in the order the computing system 104 received the first and second unique identifiers. The interaction engine 222 can update the physical objects database 245 in response to determining the actions executed on the interactive display effect the physical objects in anyway.

In some embodiments, RFID readers 102 can be disposed throughout the facility. Each unique identifier associated with each RFID tag 265 integrated in the handle portion of the shopping cart 108 can uniquely identify the shopping cart. As the user is pushing the shopping cart 108 using the handle portion, the user can cover or obscure one or more RFID tags 265. The RFID readers 102 can detect that the one or more obscured RFID tags 265 are not detectable and the RFID readers 102 can detect the unique identifiers of the one or more obscured RFID tags 265. The RFID readers 102 can transmit the detected one or more unique identifiers to the computing system 104. The computing system 104 can execute the cart engine 222 in response to receiving the unique identifies. The cart engine 222 can determine the shopping cart is in use and update the cart database 280 with the status of the shopping cart 108.

As a non-limiting example, the shopping cart system 250 can be implemented in a retail store. The computing system 104 can be a Point of Sale (POS) terminal with an interactive display 106. The RFID reader 102 can be disposed with respect to the POS terminal. A customer operating a shopping cart in the retail store can navigate the shopping cart carrying products indented for purchase to a POS terminal through an archway of RFID readers 102. The products can include RFID tags 275. The RFID readers 102 can detect the RFID tags 275 disposed on the products in or about basket of the shopping cart 108. The RFID readers 102 can extract the unique identifiers from the RFID tags 275 disposed on the products disposed in or about the basket of the shopping cart 108 and transmit the unique identifiers to the computing system 104. The computing system 104 can execute the interaction engine 220 in response to receiving the unique identifiers. The interaction engine 220 can query the physical objects database 245 using the unique identifiers, to retrieve information associated with each products disposed in or about the basket of the shopping cart 108. The interaction engine 220 can display the information associated with retrieved for each of the products disposed in or about the basket of the shopping cart 108 on the interactive display 106 via one or more graphical user interfaces.

The customer may wish to interact with the interactive display 106 during the transaction. For example, the interactive display 106 can present a graphical user interface with an option to remove an item from cart, if the customer decides not to purchase one of the products. The option can be presented in the form of an "x" selection item displayed with respect to the name of the product. The customer may be able to select the "remove item from cart" selection by scrolling to the "x" selection and selecting the "x" selection. The customer can have the interactive display execute the actions using the RFID tags disposed on the handle of the shopping cart. In one embodiment, the customer can cover a first and second RFID tags with the user's digits, corresponding with the actions for scrolling to "x" and selecting "x." The RFID reader 102 and/or computing system 104 can determine the first and second RFID tags are covered due to the inability to detect/read the RFID tags. The RFID reader 102 and/or computing system can determine the order in which the RFID tags were covered, and computing system can control the interactive display based on the order in which the RFID tags were covered. The computing system 104 can execute the interaction engine 220 to retrieve the first and second actions correlated with the first and second RFID tag from the actions database 230 based on the first and second unique identifiers. The interaction engine 220 can execute the first and second action in the order in which the computing received the corresponding first and second unique identifiers (i.e. scroll to "x" and selecting "x"). The interaction engine 220 can update the physical objects database 245 based on any actions executed on the interactive display that would affect the products (i.e. purchasing a product, returning a product, removing a product from a shopping cart 108).

Figure 3:
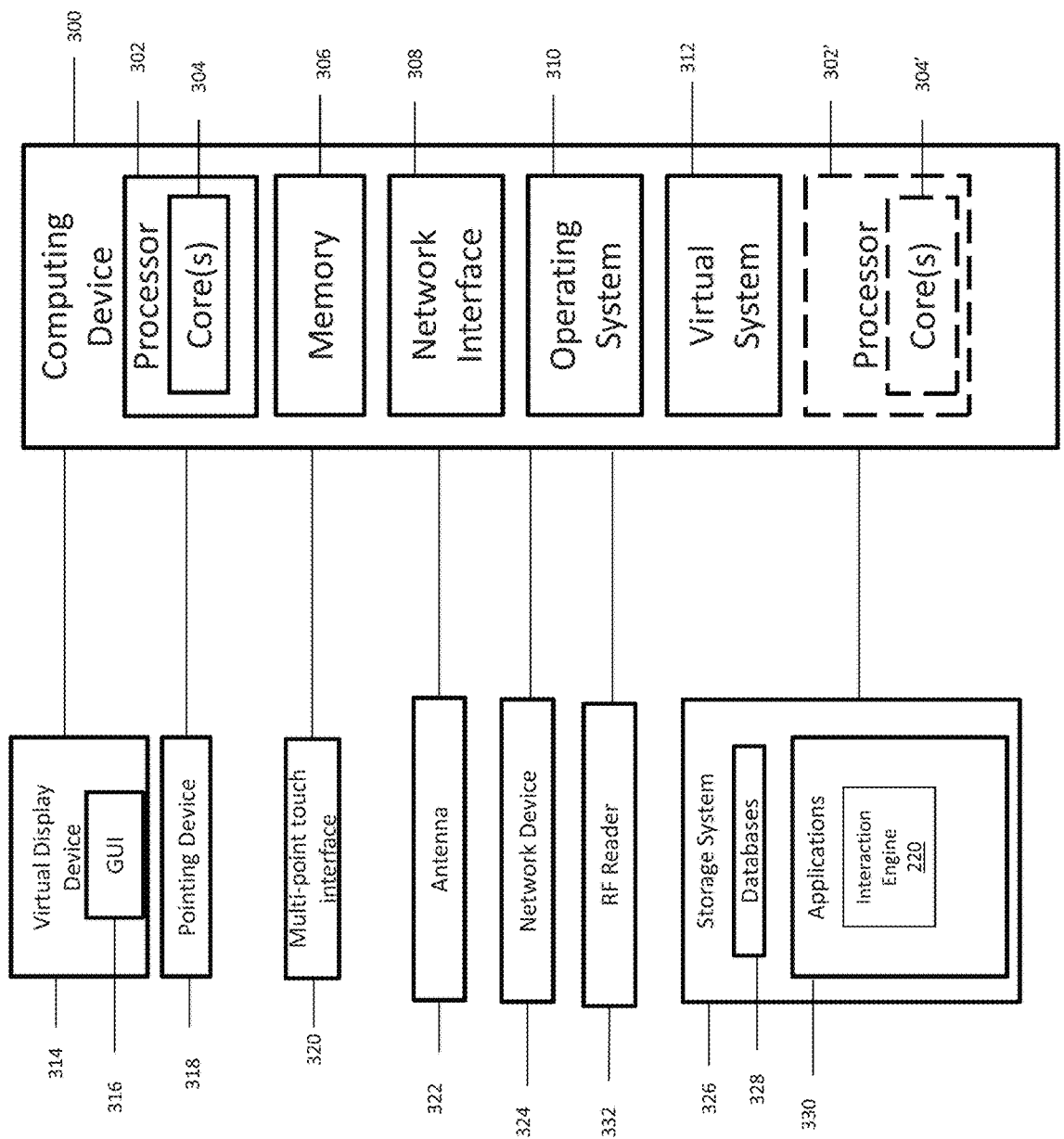
FIG. 3 illustrates an exemplary computing device in accordance with exemplary embodiments of the present disclosure.

FIG. 3 is a block diagram of an example computing device 300 for implementing exemplary embodiments of the present disclosure. Embodiments of the computing device 300 can implement embodiments of the interaction engine 220 and/or the cart engine 222. The computing device 300 includes one or more non-transitory computer-readable media for storing one or more computer-executable instructions or software for implementing exemplary embodiments. The non-transitory computer-readable media may include, but are not limited to, one or more types of hardware memory, non-transitory tangible media (for example, one or more magnetic storage disks, one or more optical disks, one or more flash drives, one or more solid state disks), and the like. For example, memory 306 included in the computing device 300 may store computer-readable and computer-executable instructions or software (e.g., applications 330 such as the interaction engine 220 and the cart engine 222) for implementing exemplary operations of the computing device 300. The computing device 300 also includes configurable and/or programmable processor 302 and associated core(s) 304, and optionally, one or more additional configurable and/or programmable processor(s) 302' and associated core(s) 304' (for example, in the case of computer systems having multiple processors/cores), for executing computer-readable and computer-executable instructions or software stored in the memory 306 and other programs for implementing exemplary embodiments of the present disclosure. Processor 302 and processor(s) 302' may each be a single core processor or multiple core (304 and 304') processor. Either or both of processor 302 and processor(s) 302' may be configured to execute one or more of the instructions described in connection with computing device 300.

Virtualization may be employed in the computing device 300 so that infrastructure and resources in the computing device 300 may be shared dynamically. A virtual machine 312 may be provided to handle a process running on multiple processors so that the process appears to be using only one computing resource rather than multiple computing resources. Multiple virtual machines may also be used with one processor.

Memory 306 may include a computer system memory or random access memory, such as DRAM, SRAM, EDO RAM, and the like. Memory 306 may include other types of memory as well, or combinations thereof.

A user may interact with the computing device 300 through a visual display device 314, such as a computer monitor, which may display one or more graphical user interfaces 316, multi touch interface 320 and a pointing device 318. The user can also interact with the visual display device via buttons on the handle portion of a shopping cart using RFID tags integrated with the shopping cart. The RFID tags can communicate with the computing device 300, via a RFID reader 332.

The computing device 300 may also include one or more storage devices 326, such as a hard-drive, CD-ROM, or other computer readable media, for storing data and computer-readable instructions and/or software that implement exemplary embodiments of the present disclosure (e.g., applications 330 e.g. the interaction engine 220 and cart engine 222). For example, exemplary storage device 326 can include one or more databases 328 for storing information regarding the physical objects, actions and shopping carts correlated to identifiers of RFID tags. The databases 328 may be updated manually or automatically at any suitable time to add, delete, and/or update one or more data items in the databases.

The computing device 300 can include a network interface 308 configured to interface via one or more network devices 324 with one or more networks, for example, Local Area Network (LAN), Wide Area Network (WAN) or the Internet through a variety of connections including, but not limited to, standard telephone lines, LAN or WAN links (for example, 802.11, T1, T3, 56 kb, X.25), broadband connections (for example, ISDN, Frame Relay, ATM), wireless connections, controller area network (CAN), or some combination of any or all of the above. In exemplary embodiments, the computing system can include one or more antennas 322 to facilitate wireless communication (e.g., via the network interface) between the computing device 300 and a network and/or between the computing device 300 and other computing devices. The network interface 308 may include a built-in network adapter, network interface card, PCMCIA network card, card bus network adapter, wireless network adapter, USB network adapter, modem or any other device suitable for interfacing the computing device 300 to any type of network capable of communication and performing the operations described herein.

The computing device 300 may run any operating system 310, such as any of the versions of the Microsoft® Windows® operating systems, the different releases of the Unix and Linux operating systems, any version of the MacOS® for Macintosh computers, any embedded operating system, any real-time operating system, any open source operating system, any proprietary operating system, or any other operating system capable of running on the computing device 300 and performing the operations described herein. In exemplary embodiments, the operating system 310 may be run in native mode or emulated mode. In an exemplary embodiment, the operating system 310 may be run on one or more cloud machine instances.

Figure 4:
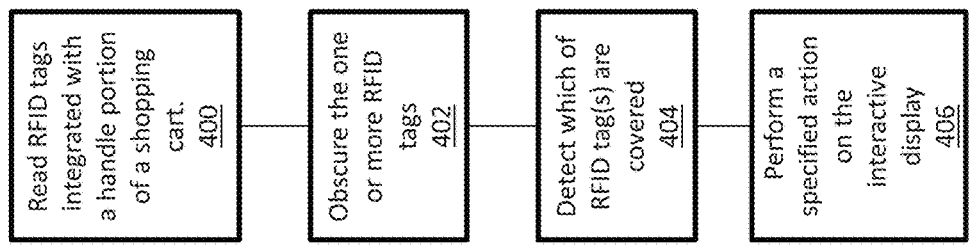
FIG. 4 is a flowchart illustrating an shopping cart authentication according to exemplary embodiments of the present disclosure.

FIG. 4 is a flowchart illustrating a process implemented by the shopping cart system according to exemplary embodiments of the present disclosure. In operation 400, a RFID reader (e.g. RFID reader 102, as shown in FIGS. 1A-2) can read RFID tags (e.g. RFID tags 138-148, 275 as shown in FIGS. 1B and 2) integrated with a handle portion (e.g. handle portion 110, 136 as shown in FIGS. 1A-B) of a shopping cart (e.g. shopping cart 108 as shown in FIGS. 1A and 2). A unique identifier can be encoded in each of the RFID tags. In operation 402, a user of the shopping cart can prevent the RFID reader from reading one or more of the RFID tags in response to a hand of a user obscuring the one or more RFID tags. In operation 404, the RFID reader can detect the unique identifiers of the RFID tags which are not covered up. The RFID reader can transmit the identifier(s) of the uncovered RFID tag(s) to a computing system (e.g. computing system 104 as shown in FIGS. 1A-2). The computing system can include an interactive display (e.g. interactive display 106 as shown in FIGS. 1A-2). The computing system can execute the interaction engine (e.g.

interaction engine 220 as shown in FIG. 2) in response to receiving the identifiers associated with the RFID tags which are not covered by the user. In operation 406, the interaction engine can determine the identifiers associated with RFID tags which are covered based on the identifiers not received by the computing system. The interaction engine can query the actions database (e.g. actions database 230 as shown in FIG. 2) using the identifiers of the covered up RFID tags or alternatively, using the combination of identifiers of the uncovered RFID tags, to retrieve a specified action to be performed on the interactive display based on identifier(s) of the covered RFID tag(s). In operation 408, the computing system can control the interactive display, to perform a specified action on the interactive display.

Figure 5:
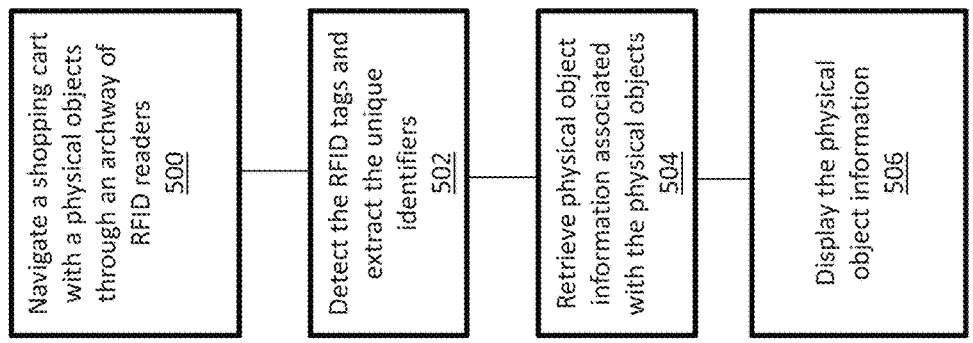
FIG. 5 is a flowchart illustrating a process of automatically scanning physical objects implemented by the shopping cart system according to exemplary embodiments of the present disclosure.

FIG. 5 is a flowchart illustrating a process of automatically scanning physical objects implemented by the shopping cart system according to exemplary embodiments of the present disclosure. In operation 500, a user navigate a shopping cart (e.g. shopping cart 108 as shown in FIGS. 1A and 2) with a physical objects (e.g. physical objects 118 as shown in FIG. 1A) disposed in the basket (e.g. basket 116 as shown in FIG. 1A) of the shopping cart through an archway of RFID readers (e.g. archway of RFID readers 122 as shown in FIG. 1A). RFID tags (e.g. RFID tags 120 as shown in FIG. 1A) can be disposed on the physical objects. The RFID tags can be encoded with unique identifiers associated with the physical objects. In operation 502, the archway of RFID readers can detect the RFID tags and extract the unique identifiers as the shopping cart passes through the archway of RFID readers. The RFID readers can transmit the unique identifiers to the computing system (e.g. computing system 104 as shown in FIGS. 1A-2). The computing system can include an interactive display (e.g. interactive display 106 as shown in FIGS. 1A-2). In operation 504, the computing system can query the physical objects database 245 to retrieve physical object information associated with the physical objects disposed in the shopping cart using the unique identifiers. In operation 506, the computing system can control the interactive display to display the physical object information.

In describing exemplary embodiments, specific terminology is used for the sake of clarity. For purposes of description, each specific term is intended to at least include all technical and functional equivalents that operate in a similar manner to accomplish a similar purpose. Additionally, in some instances where a particular exemplary embodiment includes a plurality of system elements, device components or method steps, those elements, components or steps may be replaced with a single element, component or step. Likewise, a single element, component or step may be replaced with a plurality of elements, components or steps that serve the same purpose. Moreover, while exemplary embodiments have been shown and described with references to particular embodiments thereof, those of ordinary skill in the art will understand that various substitutions and alterations in form and detail may be made therein without departing from the scope of the present disclosure. Further still, other aspects, functions and advantages are also within the scope of the present disclosure.

Exemplary flowcharts are provided herein for illustrative purposes and are non-limiting examples of methods. One of ordinary skill in the art will recognize that exemplary methods may include more or fewer steps than those illustrated in the exemplary flowcharts, and that the steps in the exemplary flowcharts may be performed in a different order than the order shown in the illustrative flowcharts.

We claim:

1. A shopping cart system comprising:
a computing system including a database and an interactive display;
at least one RFID reader in communication with the computing system;
a cart including a frame having a handle portion, a basket supported by the frame, and a plurality of casters configured to support the frame; and
a plurality of RFID tags integrated with the handle portion disposed near a surface of the handle portion, the plurality of RFID tags being readable by the at least one RFID reader in response to the plurality of RFID tags being with range of the at least one RFID reader, wherein a subset of the plurality of RFID tags correlates with a different action on the interactive display;
wherein the at least one RFID reader is prevented from reading a RFID tag in the plurality of RFID tags in response to the RFID tag in the plurality of RFID tags being selectively obscured to select the subset of the plurality of RFID tags; and
wherein the computing system is configured to control the interactive display to perform the different action on the interactive display in response to determining that the subset of the plurality of RFID tags that correlates with the different action have been selected.

2. The system in claim 1, wherein the plurality of RFID tags are each selectively obscurable in response to being covered by at least one digit of a user.

3. The system in claim 2, wherein the computing system is further configured to determine which one of the RFID tags is obscured and query the database to retrieve the action which correlates to the obscured RFID tag.

4. The system in claim 1, wherein the action is one or more of scroll, input information, and make selections on the interactive display.

5. The system in claim 1, wherein the plurality of RFID tags are passive RFID tags.

6. The system in claim 1, wherein a plurality of physical objects are disposable in the basket of the cart and each of the physical objects includes an item RFID tag,
wherein the item RFID tags are encoded with identifiers associated with each of the physical objects.

7. The system in claim 6, wherein the at least one RFID reader is configured to detect the RFID tags included on the physical objects and decode the identifiers.

8. The system in claim 7, wherein the computing system is further configured to:
receive the identifiers associated with each of the physical objects from the at least one RFID reader;
query the database to retrieve information associated with each of the physical objects; and
control the interactive display to display the information associated with each of the physical objects.

9. A method comprising:
reading, via at least one RFID reader, a plurality of RFID tags integrated with a handle portion of a shopping cart;
selectively preventing the at least one RFID reader from reading at least one of the plurality of RFID tags in response to a hand of a user obscuring the at least one of the plurality of RFID tags, wherein a subset of the plurality of RFID tags correlates with a different action on an interactive display; and
controlling, via a computing system in communication with the at least one RFID reader, an interactive display to perform a specified action that correlates with the different action on the interactive display in response to determining that the at least one of the plurality of RFID tags was unreadable by the at least one RFID reader.

10. The method of claim 9, further comprising:
preventing the at least one RFID reader from reading a different one of the plurality of RFID tags in response to the different one of the plurality of RFID tags being obscured by the hand of the user; and
controlling, via a computing system in communication with the at least one RFID reader, the interactive display to perform a different action on the interactive display in response to determining that the different one of the plurality of RFID tags was unreadable by the at least one RFID reader.

11. The method in claim 9, further comprising:
determining, via the computing system, which one of the RFID tags is obscured; and
querying, via the computing system, a database to retrieve the specified action which correlates to the obscured RFID tag.

12. The method in claim 9, wherein the action is one or more of scroll, input information, and make selections on the interactive display.

13. The method in claim 9, wherein the plurality of RFID tags are passive RFID tags.

14. The method in claim 9, further comprising:
receiving physical object in a basket of the shopping cart, each of the physical objects including an RFID tag, and each of the RFID tags are encoded with a identifier associated with a corresponding one of the physical objects.

15. The method in claim 14, further comprising:
detecting, via the at least one RFID reader, the RFID tags included on the physical objects received in the basket; and
decoding the identifiers.

16. The method in claim 15, further comprising:
receiving, via the computing system, the identifiers associated with each of the physical objects from the at least one RFID reader;
querying, via the computing system, a database to retrieve information associated with each of the physical objects; and
controlling, via the computing system, the interactive display to display the information associated with each of the physical objects.

17. A shopping cart system comprising:
a computing system;
a plurality of RFID readers in communication with the computing system, the plurality of RFID readers being distributed throughout a facility;
a plurality of shopping carts, each of the plurality of shopping carts including a frame having a handle portion, a basket supported by the frame, and a plurality of caster configured to support the frame; and
at least one RFID tag integrated with the handle portion of each of the plurality of shopping carts, the at least one RFID tag integrated into each of the plurality of shopping carts being readable by the at least one of the plurality of RFID reader in response to the at least one RFID tag of each of the plurality of shopping carts being within range of the at least one of the RFID readers,
wherein the at least one RIFD tag integrated into each of the plurality of shopping carts is configured to be selectively obscured in response to being covered by hands of users of the plurality of shopping carts to prevent the plurality of RFID readers from reading the at least one RFID tag integrated in each of the plurality of shopping carts and selectively unobscured to permit the plurality of RFID readers to read the at least one RFID tag integrated into each of the plurality of shopping carts, and
wherein the computing system is configured to determine a quantity of the plurality of shopping carts being used by users over a time period based on whether the plurality of RFID readers are permitted or prevented from reading the at least one RFID tag integrated in each of the plurality of shopping carts.

18. The system of claim 17, wherein the computing system is configured to determine a location of each of the plurality of shopping carts in the facility when the at least one RFID tag integrated into each of the plurality of shopping carts is unobscured.

19. The system in claim 18, wherein the computing system is further configured to query a database to retrieve a location of at least one of the plurality of RFID readers in the facility that reads the at least one RFID tag integrated in a first one of the plurality of shopping carts when the at least one RFID tag integrated into the first one of the plurality of shopping carts is unobscured, and
wherein the location of the first one of the plurality of shopping carts is estimated by the location of the at least one RFID reader.

20. The system in claim 17, wherein the plurality of RFID tags are passive RFID tags.

* * * * *